(12) United States Patent
Mattigod et al.

(10) Patent No.: US 7,691,637 B2
(45) Date of Patent: Apr. 6, 2010

(54) METHOD AND APPARATUS FOR ION SEQUESTRATION AND A NANOSTRUCTURED METAL PHOSPHATE

(75) Inventors: Shas V. Mattigod, Richland, WA (US); Glen E. Fryxell, Kennewic, WA (US); Xiaohong Li, Richland, WA (US); Kent E. Parker, Kennewick, WA (US); Dawn M. Wellman, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1268 days.

(21) Appl. No.: 11/195,394

(22) Filed: Aug. 1, 2005

(65) Prior Publication Data

US 2007/0026531 A1    Feb. 1, 2007

(51) Int. Cl.
    *G01N 33/20* (2006.01)
(52) U.S. Cl. .................. 436/73; 977/902; 210/682; 95/133
(58) Field of Classification Search .................. 436/73, 436/166; 205/408; 210/682; 95/133; 977/902
    See application file for complete search history.

(56) References Cited

U.S. PATENT DOCUMENTS

| 4,800,024 | A | 1/1989 | Elfline |
| 4,902,665 | A | 2/1990 | Elfline |
| 2003/0196966 | A1 | 10/2003 | Hughes |

FOREIGN PATENT DOCUMENTS

JP    2003 176112 A    6/2003

OTHER PUBLICATIONS

S. Polarz and B. Smarsly, J.Nanosci. Nanotech, 2002, 2, #6, pp. 581-612.
A.K. Cheetham, G. Ferey, and T. Loiseau, Angew.Chem. Int. Ed. 1999, 38, pp. 3269-3292.
S. Natarajan, J. Solid Stae Chem. , 1999, 148, pp. 50-55.
S. Natarajan, M. P. Attfield and A.K. Cheetham, Angew. Chem. Int. Ed., 1997, 36, pp. 978-980.
S. Natarajan, S. Ayyappan, A.K. Cheetham, and C.N. R. Rao, Chemical Material, 1998, 10, pp. 1627-1631.
S. Natarajan and A.K. Cheetham, Chem. Comm., 1997, pp. 1089-1090.
S. Natarajan and A.K. Cheetham, J. Solid State Chem., 1997, 134, pp. 207-210.

(Continued)

*Primary Examiner*—Michael A Marcheschi
*Assistant Examiner*—Jonathan M Hurst
(74) *Attorney, Agent, or Firm*—Allan C. Tuan

(57) ABSTRACT

A nanostructured substance, a process for sequestration of ionic waste, and an ion-sequestration apparatus are disclosed in the specification. The nanostructured substance can comprise a Lewis acid transition metal bound to a phosphate, wherein the phosphate comprises a primary structural component of the substance and the Lewis acid transition metal is a reducing agent. The nanostructured substance has a Brunner-Emmet-Teller (BET) surface area greater than or equal to approximately 100 $m^2/g$, and a distribution coefficient for an analyte, $K_d$, greater than or equal to approximately 5000 ml/g. The process can comprise contacting a fluid and a nanostructured metal phosphate. The apparatus can comprise a vessel and a nanostructured metal phosphate. The vessel defines a volume wherein a fluid contacts the nanostructured metal phosphate.

15 Claims, 3 Drawing Sheets

OTHER PUBLICATIONS

S. Ayyappan, X Bu, A.K. Cheetham, and C.N. R. Rao, Chem Mater., 1998, 10, p. 3308.

S. Ayyappan, A.K. Cheetham, S. Natarajan, and C.N.R. Rao, J. Solid State Chem., 1998, 207, p. 207-210.

R. P. Bontchev and R.C. Moore, Solid State Sci., 2004, 6, pp. 867-873.

C. Serre, A. Auroux, A. Gervasini, M. Hervieu, and G. Ferey, Angew. Chem. Int. Ed., 2002, 41, #9, pp. 1594-1597.

C. Serre, and G. Ferey, Chem. Comm., 2003, pp. 1818-1819.

N. Kishor, et al., Synthesis of a Novel Mesoporous Tin Phospahte, SnPO4, ChemCommun, 2002, pp. 112-113.

PCT International Search Report/Written Opinion (Dec. 13, 2006).

Ma, Ying, A review of zeolite-like porous materials, Elsevier, 2003, pp. 742-750.

Mal N K et al, Synthesis of a novel mesoporous tin phosphate, SnP04, Chem. Communi., No. 2, Feb. 7, 2002, pp. 112-113, XP002409570.

Fryxell, Glen E. et al, Nanoporous Ti & Zr Phosphate Getter Materials, Yucca Mountain Waste Water Repository, Nov. 18-19, 2004, pp. 40-41, XP-002409492.

Jow, H.N., et al., WM'05 Conference, Feb. 27-Mar. 3, 2005, XP-002409617, pp. 1-15.

METHOD AND APPARATUS FOR ION SEQUESTRATION AND A NANOSTRUCTURED METAL PHOSPHATE

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Nanoporous materials can provide an efficient way of selectively concentrating many types of waste materials in a relatively small volume. Silica-based sorbent materials have demonstrated extremely high binding affinities for numerous metals and have precluded subsequent leaching from the laden material. However, silica-based nanoporous materials can require surface modification and are typically unstable under alkaline conditions (pH>9). Thus, there is a need for an efficient process for ion sequestration and for a robust material having a high surface area and high ion sequestration characteristics.

SUMMARY

Nanostructured metal phosphates can be synthesized exhibiting high ion sequestration characteristics and stability at relatively high temperatures and through relatively wide ranges of pH values. Accordingly, one embodiment of the present invention encompasses a nanostructured substance comprising a Lewis acid transition metal bound to a phosphate. The phosphate comprises a primary structural component of the substance and the Lewis acid transition metal is a reducing agent. The nanostructured substance has a Brunner-Emmet-Teller (BET) surface area greater than or equal to approximately 100 $m^2/g$, and a distribution coefficient for an analyte, $K_d$, greater than or equal to approximately 5000 ml/g. Examples of Lewis acid transition metals can include, but are not limited to, Sn (II), Ti (III), V(III), Sm (II), In (II), In (III), Ce (III), and Eu (II).

In some embodiments, the nanostructured substance is amorphous. In other embodiments, it can be crystalline. It can have a morphology that is thermally stable and does not collapse after heat treatments. Accordingly, the nanostructured substance can have, for example, a substantially worm-like aggregate morphology and/or a substantially spherical aggregate morphology. The pores can have a diameter greater than or equal to approximately 1.5 nm. Furthermore, the pores can have a diameter less than or equal to approximately 30 nm. In another embodiment, the pores of the nanostructured substance do not form a hexagonal packing structure. In yet another embodiment, the nanostructured substance is not subjected to post-synthesis, surface modification.

Another embodiment of the present invention encompasses a process to sequester an analyte from a fluid. The process comprises contacting a nanostructured metal phosphate and a fluid containing an analyte, wherein the nanostructured metal phosphate is a reducing agent for the analyte. In one embodiment, the nanostructured metal phosphate comprises a Lewis acid transition metal bound to a phosphate. The phosphate comprises a primary structural component of the substance and the Lewis acid transition metal is a reducing agent. The nanostructured substance has a BET surface area greater than or equal to approximately 100 $m^2/g$, and a distribution coefficient for an analyte, $K_d$, greater than or equal to approximately 5000 ml/g.

The process can further comprise physical separation to remove solids from the fluid. Techniques for physical separation can include, but are not limited to, decanting, filtering, centrifuging, and distilling. The solids can comprise at least one analyte sequestered by the nanostructured metal phosphate. Analytes can comprise a material for which the nanostructured metal phosphate is a reducing agent. In one embodiment, the analytes comprise an element selected from the group consisting of technetium (VII), neptunium (V), chromium (VI), uranium (VI), arsenic (V), selenium (VI), iodine (VII), thalium (III), and combinations thereof. The fluid can comprise, for example, liquid water, water vapor, organic solvents, supercritical fluids, compressed gases, oils, molten salts, and combinations thereof.

Still another embodiment encompasses an ion-sequestration apparatus comprising a vessel and a nanostructured substance. The vessel defines a volume wherein a fluid can contact the nanostructured substance, which fluid contains an analyte to be sequestered. The vessel can comprise an inlet for the fluid and an outlet for the effluent. Alternatively, the vessel can comprise a mesh and/or perforated structure that allows the fluid to pass through and contact the nanostructured substance. The nanostructured substance comprises a Lewis acid transition metal bound to a phosphate, wherein the phosphate comprises a primary structural component of the substance and the Lewis acid transition metal is a reducing agent. The nanostructured substance has a surface area greater than or equal to approximately 100 $m^2/g$, and a distribution coefficient for an analyte, $K_d$, greater than or equal to approximately 5000 ml/g.

DESCRIPTION OF DRAWINGS

Embodiments of the invention are described below with reference to the following accompanying drawings.

DETAILED DESCRIPTION

Figure 1:
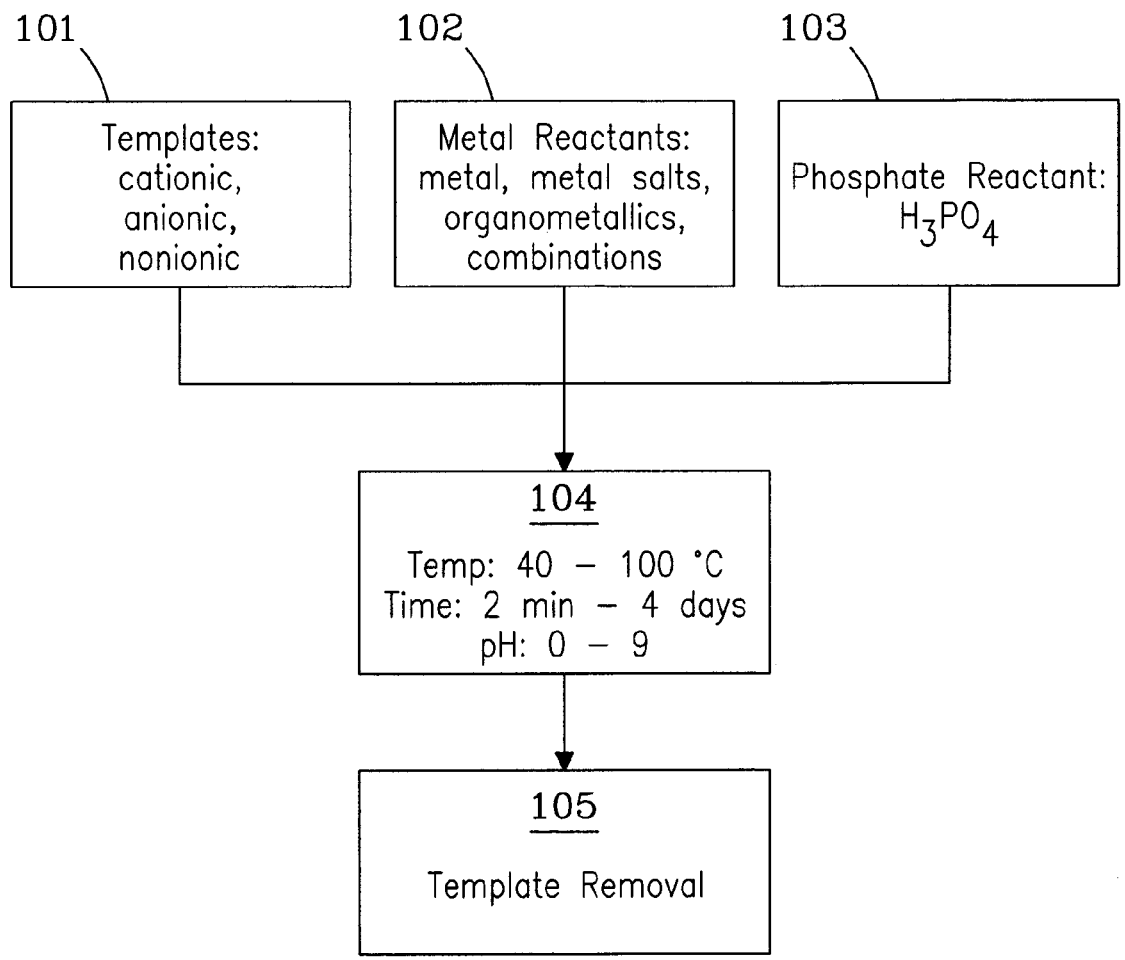
FIG. 1 is a flow diagram summarizing parameters and starting materials for a surfactant-templating technique that can be used to prepare nanostructured metal phosphates.

FIG. 1 provides an overview of parameters and starting materials for a surfactant-templating technique through which the nanoporous substance can be prepared. Such parameters and starting materials are intended to serve as examples and not as limitations to the scope of the present invention. Thus, alternative synthesis techniques can be utilized to prepare the nanoporous metal phosphate described herein while still falling within the scope of the present invention.

Referring to FIG. 1, the templates 101 can be cationic, anionic, and/or nonionic. More specifically, examples of surfactants include, but are not limited to, cetyltrimethylammonium chloride (CTAC), octadecyltrimethylammonium chloride (ODTMACl), and octadecyltrimethylammonium bromide (ODTMABr). Metal reactants 102 of the Lewis acid transition metal can include, but are not limited to, elemental metals, metal salts, organometallics, and combinations thereof. Examples of specific metal salts can include, but are not limited to metal chlorides such as $SnCl_2 \cdot 2H_2O$, $VCl_3$, and $InCl_2$. Alternatively, elemental metal can be used as a metal reactant. For example, a concentrated starting solution for tin can be prepared by dissolving tin metal in concentrated hydrochloric acid. Phosphate reactants 103 can include an acid such as $H_3PO_4$, phosphate esters (e.g. tributyl phosphate), phosphoryl halides (e.g. $POCl_3$, $PCl_5$), phosphoric anhydrides (e.g. $P_2O_5$), and combinations thereof.

According to the present example, a mixture comprising the metal reactant, the surfactant, and the phosphate reactant can be subjected to a precipitation period 104. During precipitation, the mixture can be heated to temperatures between approximately 40° C. and approximately 200° C. for a duration between approximately 2 minutes and approximately 4 days. The pH of the mixture can range from approximately zero to approximately nine. After collecting the precipitates, the surfactant can be removed 105 from the synthetic material by calcining and/or extraction techniques. Vacuum filtration is one technique that can be used to collect the precipitates. Calcination can occur at approximately 150° C. to 500° C. One example of an extraction technique is Soxhlet extraction.

Figure 2:
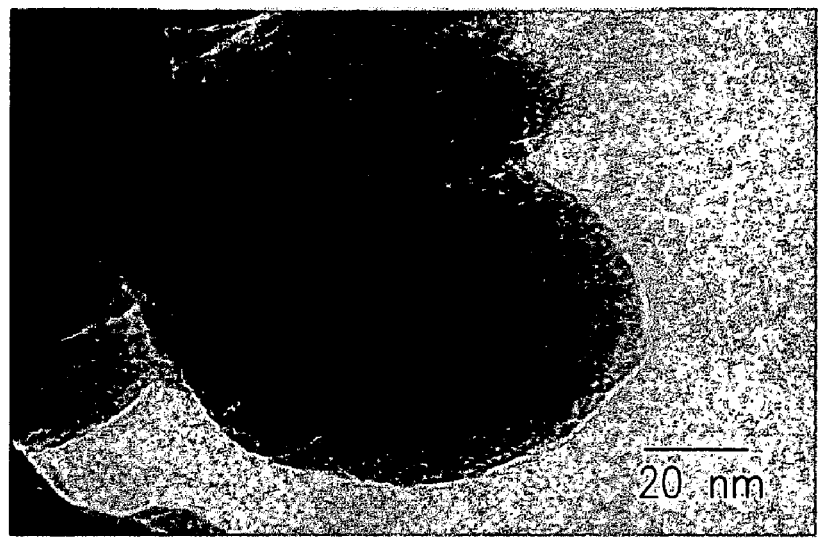
FIG. 2 is a high-resolution transmission electron microscope (HR-TEM) micrograph of an embodiment of nanostructured tin (II) phosphate.
Figure 3:
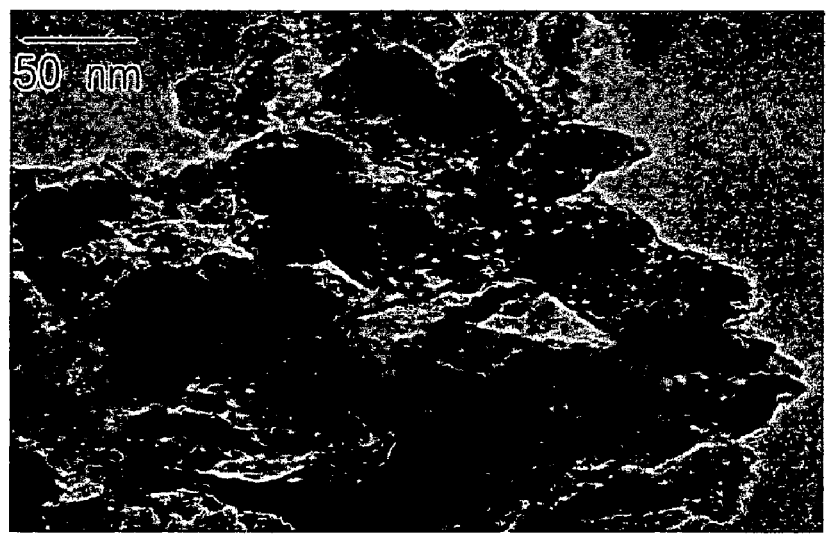
FIG. 3 is a high-resolution transmission electron microscope (HR-TEM) micrograph of an embodiment of nanostructured tin (II) phosphate.
Figure 4:
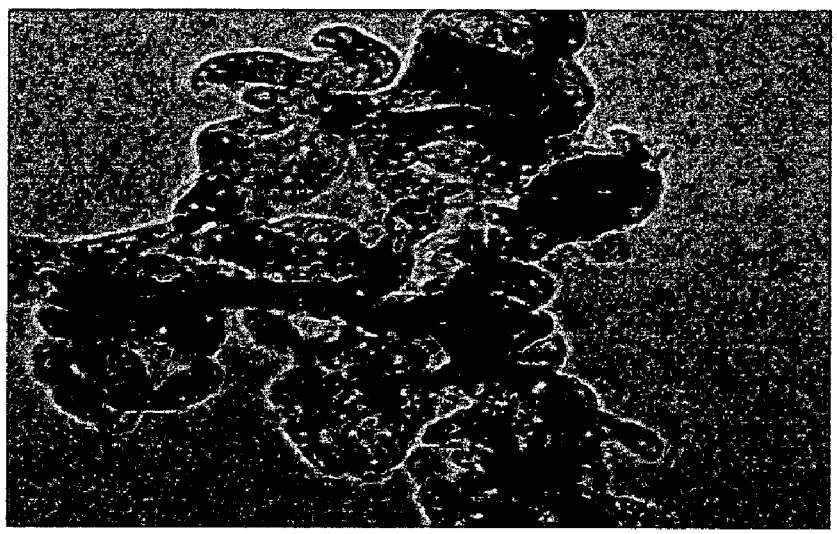
FIG. 4 is a high-resolution transmission electron microscope (HR-TEM) micrograph of an embodiment of nanostructured tin (II) phosphate.

Samples of the nanostructured substance prepared using conditions similar to those described above exhibited a variety of properties. For example, referring to the embodiment shown in FIG. 2, the nanostructured substance can have a spherical aggregate morphology. On a slightly larger scale, as shown in FIG. 3, the material can have an irregularly-shaped morphology. Furthermore, the material can have a substantially worm-like aggregate morphology, as shown in FIG. 4. Referring to FIG. 2, one embodiment of the nanostructured substance does not have pores that are hexagonally packed.

Figure 5:
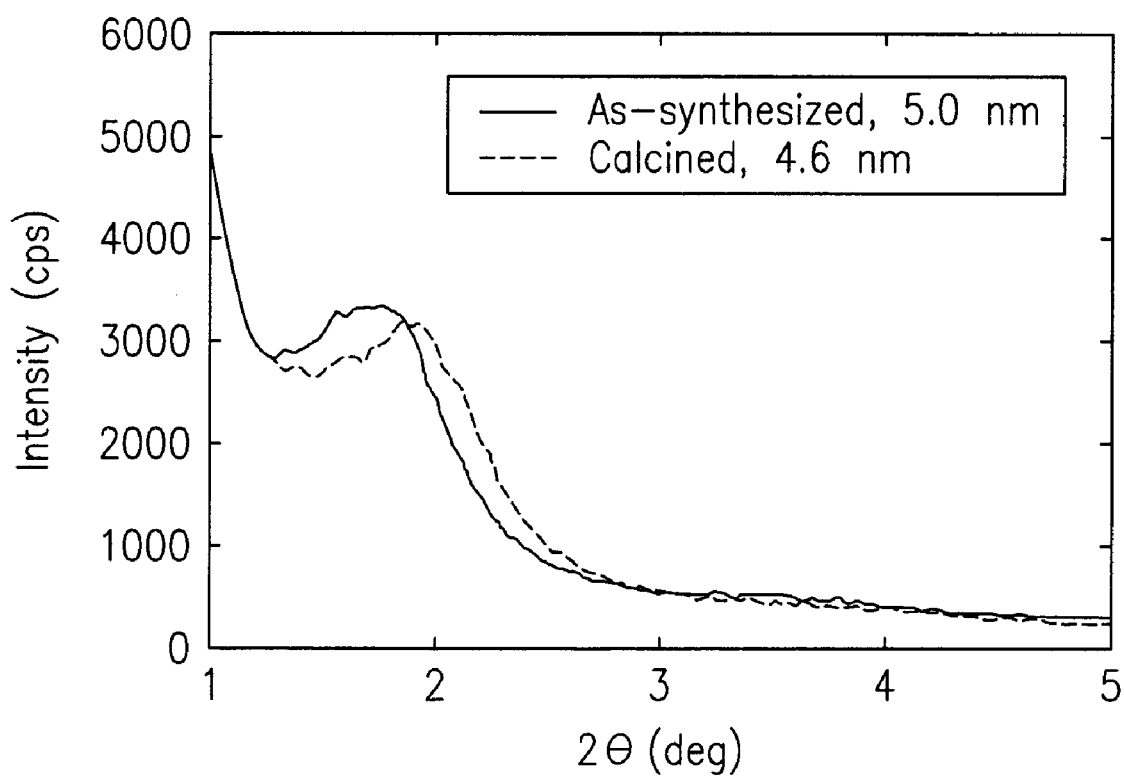
FIG. 5 is a graph showing low-angle X-ray diffraction (XRD) patterns for surfactant and calcined tin (II) phosphate.

In general, the nanostructured substance has a morphology that is stable at temperatures commonly utilized for calcinations. In other words, the pore structure resists collapsing upon heating. A common temperature range during calcinations can range from approximately 150° C. to approximately 500° C. FIG. 2 shows a HR-TEM micrograph of nanostructured $Sn(II)PO_4$ wherein the pore structure is intact after calcination at 500° C. FIG. 5 shows low-angle X-ray diffraction (XRD) patterns for a surfactant $Sn(II)PO_4$ and calcined $Sn(II)PO_4$. The d-spacing of the 100 planes in this case were approximately 5.0 nm as synthesized, and approximately 4.6 nm after calcination indicating, again, that the pore structure can remain after calcination.

Table 1 summarizes examples of some of the conditions and reagents used to synthesize a plurality of embodiments of the present invention as well as the as-synthesized d-spacing. The examples and values shown in Table 1 are not intended to be limitations to the scope of the present invention.

TABLE 1

Examples of reagents and conditions for synthesis of embodiments of the present invention

| Metal | Surfactant | Acid | Molar ratio (Metal:Surf.:Acid) | Synthesis Conditions | d-spacing (nm) |
|---|---|---|---|---|---|
| $SnCl_2H_2O$ | CTAC | $H_3PO_4$ | 2:1:6.8 | 65° C., 72 hrs. | 2.77 |
| $VCl_3$ | CTAC | $H_3PO_4$ | 1.4:1:6.8 | 65° C., 1 week, adjusted to pH 4 with $NH_4OH$ | 2.87 |
| $InCl_2$ | CTAC | $H_3PO_4$ | 1.8:1:6.8 | 65° C., 1 week, adjusted to pH 4 with $NH_4OH$ | 1.56 |
| Sn Metal | ODTMACl | $H_3PO_4$ | 1:1:6.8 | 65° C., 72 hrs. | 5.57 |

Additional metals that can be used to synthesize the nanostructured substance include, but are not limited to Ti (III), Sm (II), In (III), Ce (III), and Eu (II). Sources for these metals can be in the form of elemental metal or metal compounds. The materials summarized in the Table 1 are amorphous and the d-spacing values are a result of the pore structure.

EXAMPLE

Preparation of Nanostructured Tin Phosphate and Sequestration of $^{99}Tc$

Nanostructured tin phosphate was synthesized by preparing 200 mL of 6.87 mmol CTAC, $CH_3(CH_2)_{14}N(CH_3)_3Cl$, in deionized water. The solution was acidified with 0.626 mL of concentrated phosphoric acid. A concentrated solution of 15.222 g stannic chloride was dissolved in 100 mL hydrochloric acid. 2.5 mL of $SnCl_2$/HCl solution was added with stirring at room temperature to the acidified surfactant. The solution stirred for 30 minutes at room temperature and was placed in an oven at 65° C. for 48-72 hours. The synthetic material was collected via vacuum filtration using a 0.45 μm filter, washed with deionized water and dried under ambient conditions. Chemical analysis of the synthetic material indicated the structure was composed of Sn, P, and O with a ratio of 1:1:5, respectively. Calcination of the as-synthesized material at 500° C. produced a material with a surface area of 262 $m^2$/g. No structural changes were observed following calcination. Examples of surface areas for a plurality of other tin phosphate samples are summarized in Table 2.

TABLE 2

Surface areas for various nanostructured tin phosphate samples.

| Metal | Surfactant | Acid | BET Surface Area ($m^2$/g) |
|---|---|---|---|
| $SnCl_2$ | CTAC | $H_3PO_4$ | 265 |
| $SnCl_2$ | ODTMACl | $H_3PO_4$ | 297 |
| Sn metal | CTAC | $H_3PO_4$ | 372 |
| Sn metal | ODTMACl | $H_3PO_4$ | 250 |
| $SnCl_2$ | CTAC | $H_3PO_4$ | 194 |

Batch contact experiments were performed with the nanostructured Sn(II)PO$_4$ using 2000 dpm/mL spiked solutions of $^{99}$Tc in 0.002 M NaHCO$_3$ and in groundwater. The groundwater had a competing sulfate concentration of 0.02 M. Equilibrium was achieved in less than an hour at a solution-to-solids ratio of 100. Therefore a batch contact time of 2 hours was used to ensure that these values reasonably represented true equilibrium conditions. Under these conditions the nanoporous, calcined tin (II) phosphate removed more than approximately 95% of the $^{99}$Tc from solution. Distribution coefficients, K$_d$, are defined as a mass-weighted partition coefficient. K$_d$ values were typically greater than approximately 5,000 ml/g in groundwater, with individual measurements as high as 1,800,000 ml/g being observed for removal of $^{99}$Tc from the 0.002 M NaHCO$_3$ solution. At a solution to solids ratio of 100, a K$_d$ value of 100,000 indicates that at equilibrium there was 1000 times as much $^{99}$Tc in the nanoporous metal phosphate phase as there was remaining in the supernantant solution.

The affinity of tin (II) phosphate for additional anionic species was also evaluated for Np(V). Batch studies were conducted with a 2000 dpm/mL solution of Np(V) in 0.002 M NaHCO$_3$. Equilibrium was again achieved in less than an hour at a solution to solids ratio of 100. Therefore a batch contact time of 2 hours was used to insure these values represent true equilibrium conditions. Under these conditions the nanoporous, calcined tin (II) phosphate removed more than approximately 95% of the Np(V) from solution. K$_d$ values were typically greater than 100,000 for Np(V) in 0.002 M NaHCO$_3$ solution. Table 3 summarizes the K$_d$ values for analytes in various test matrices.

TABLE 3

K$_d$ values for analytes is various test matrices.
The solid-to-solution ratio is 1:100.

| Test Matrix | Spike Concentration | K$_d$ (ml/g) |
| --- | --- | --- |
| Np(V) spiked 0.002 M NaHCO$_3$ | 2000 dpm/ml | >111,900 |
| Cr(VI) spiked 0.002 M NaHCO$_3$ | 1 ppm | >56,200 |
| Cr(VI) spiked Groundwater + 0.02 M Na$_2$SO$_4$ | 1 ppm | >44,200 |
| $^{99}$Tc spiked 0.002 M NaHCO$_3$ | 900 pCi/ml | >90,000 |
| $^{99}$Tc spiked groundwater | 15 pCi/ml | >7,000 |
| $^{99}$Tc spiked groundwater | 20 pCi/ml | >13,800 |
| $^{99}$Tc spiked groundwater | 100 pCi/ml | >21,200 |
| $^{99}$Tc spiked groundwater | 200 pCi/ml | >21,900 |
| $^{99}$Tc spiked groundwater | 400 pCi/ml | >25,500 |
| $^{99}$Tc spiked groundwater | 800 pCi/ml | >30,000 |

While batch contact experiments have been described in the proof-of-principle tests above, the scope of the present invention is not limited to batch processes for ion sequestration.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A nanostructured substance comprising a Lewis acid transition metal bound to a phosphate, wherein the phosphate comprises a primary structural component of the substance and the Lewis acid transition metal is a reducing agent selected from the group consisting of Sn (II), Ti (III), V(III), Sm (II), In (II), In (III), Ce (III), Eu (II), and combinations thereof, the nanostructured substance having a surface area greater than or equal to approximately 100 m$^2$/g, and a distribution, k$_d$, greater than or equal to approximately 5000 ml/g for an analyte selected from the group consisting of technetium (VII), neptunium (V), chromium (VI), uranium (VI, arsenic (V), selenium (VI), iodine (VII), thalium (III), and combinations thereof.

2. The nanostructured substance as recited in claim 1, having a substantially worm-like aggregate morphology.

3. The nanostructured substance as recited in claim 1, having a substantially spherical aggregate morphology.

4. The nanostructured substance as recited in claim 1, wherein the nanostructured substance is amorphous.

5. The nanostructured substance as recited in claim 1, comprising pores having a diameter greater than or equal to approximately 1.5 nm.

6. The nanostructured substance as recited in claim 1, comprising pores having a diameter less than or equal to approximately 30 nm.

7. The nanostructured substance as recited in claim 1, wherein the surface of the nanostructured substance is not post-synthesis modified.

8. The nanostructured substance as recited in claim 1, wherein pores of the nanostructured substance do not form a hexagonal packing structure.

9. A process comprising the step of contacting a nanostructured metal phosphate and a fluid comprising an analyte, wherein the nanostructured metal phosphate comprises a Lewis acid transition metal bound to a phosphate that comprises a primary structural component of the substance, the Lewis acid transition metal is a reducing agent selected from the group consisting of Sn (II), Ti (II), V(III), Sm (II), In (II), In (III), Ce (III), Eu (II), and combinations thereof, the nanostructured substance having a surface area greater than or equal to approximately 100 m$^2$/g, and a distribution coefficient, K$_d$, greater than or equal to approximately 5000 ml/g for an analyte selected from the group consisting of technetium (VII), neptunium (V), chromium (VI), uranium (VI), arsenic (V), selenium (VI), iodine (VII), thalium (III), and combinations thereof, thereby sequestering the analyte from the fluid.

10. The process as recited in claim 9, further comprising the step of physically separating to remove solids from the fluid.

11. The process as recited in claim 10, wherein the step of physically separating is decanting, filtering, centrifuging, distilling, or combinations thereof.

12. The process as recited in claim 9, wherein the fluid is selected from the group consisting of liquid water, water vapor, organic solvents, supercritical fluids, compressed gases, oils, molten salts, and combinations thereof.

13. The process as recited in claim 9, wherein the surface of the nanostructured substance is not post-synthesis modified.

14. The process as recited in claim 9, wherein pores of the nanostructured substance do not form a hexagonal packing structure.

15. An ion-sequestration apparatus comprising:
   a. a fluid comprising an analyte selected from the group consisting of technetium (VII), neptunium (V), chromium (VI), uranium (VI), arsenic (V), selenium (VI.), iodine (VII), thalium (III), and combinations thereof; and
   b. a nanostructured substance comprising a Lewis acid transition metal bound to a phosphate, wherein the phosphate comprises a primary structural component of the substance and the Lewis acid transition metal is a reducing agent selected from the group consisting of Sn (II), Ti (III), V(III), Sm (II), In (II), In (III), Ce (III), Eu (II), and combinations thereof, the nanostructured substance having a surface area greater than or equal to approximately 100 $m^2/g$, and a distribution coefficient for the analyte, $K_d$, greater than or equal to approximately 5000 ml/g; and c. a vessel defining a volume wherein the fluid contacts the nanostructured substance.

* * * * *

UNITED STATES PATENT AND TRADEMARK OFFICE
CERTIFICATE OF CORRECTION

| | | |
|---|---|---|
| PATENT NO. | : 7,691,637 B2 | Page 1 of 1 |
| APPLICATION NO. | : 11/195394 | |
| DATED | : April 6, 2010 | |
| INVENTOR(S) | : Mattigod et al. | |

It is certified that error appears in the above-identified patent and that said Letters Patent is hereby corrected as shown below:

Col. 6, Line 31 - Replace "Ti (II)" with "Ti (III)".

Signed and Sealed this

Second Day of November, 2010

David J. Kappos
*Director of the United States Patent and Trademark Office*